(12) United States Patent
Weigert

(10) Patent No.: US 6,409,397 B1
(45) Date of Patent: Jun. 25, 2002

(54) SURFACE-MOUNTED, FIBER-OPTIC TRANSMITTING OR RECEIVING COMPONENT HAVING A DEFLECTION RECEPTACLE WHICH CAN BE ADJUSTED DURING ASSEMBLY

(75) Inventor: Martin Weigert, Hardt (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/677,561

(22) Filed: Oct. 2, 2000

(30) Foreign Application Priority Data

Sep. 30, 1999 (DE) .......................................... 199 47 113

(51) Int. Cl.⁷ ................................................ G02B 6/36
(52) U.S. Cl. ........................................ 385/92; 385/88
(58) Field of Search ............................. 385/88–94, 49, 385/47; 359/152

(56) References Cited

U.S. PATENT DOCUMENTS

| | | | | |
|---|---|---|---|---|
| 4,897,711 A | * | 1/1990 | Blonder et al. ............... 257/48 |
| 5,073,003 A | * | 12/1991 | Clark ........................... 385/33 |
| 5,408,559 A | * | 4/1995 | Takahashi et al. ............ 385/89 |
| 5,487,124 A | | 1/1996 | Bowen et al. |
| 5,627,931 A | * | 5/1997 | Ackley et al. ................ 385/88 |
| 5,663,821 A | * | 9/1997 | Suda et al. .................. 359/152 |
| 6,004,046 A | * | 12/1999 | Sawada ....................... 385/92 |
| 6,040,934 A | * | 3/2000 | Ogusu et al. ................ 359/152 |
| 6,086,776 A | * | 7/2000 | Maynard ..................... 216/24 |

FOREIGN PATENT DOCUMENTS

DE 35 43 558 A1 6/1987

* cited by examiner

*Primary Examiner*—Hemang Sanghavi
*Assistant Examiner*—Scott Knauss
(74) *Attorney, Agent, or Firm*—Laurence A. Greenberg; Werner H. Stemer; Gregory L. Mayback

(57) ABSTRACT

A surface mounted, fiber-optic transmitting or receiving component, is formed from a beam deflection device which has two assemblies, in such a way that relative adjustment is possible before a fixed joint is produced between the assemblies. Due to the adjustment capability, fluctuations, due to manufacturing tolerances, in a distance between an optical fiber and a mounting surface can be compensated for.

10 Claims, 3 Drawing Sheets

SURFACE-MOUNTED, FIBER-OPTIC TRANSMITTING OR RECEIVING COMPONENT HAVING A DEFLECTION RECEPTACLE WHICH CAN BE ADJUSTED DURING ASSEMBLY

BACKGROUND OF THE INVENTION

Field of the Invention

The invention relates to a surface-mounted, fiber-optic transmitting or receiving component. In particular, the present invention relates to a surface-mounted, fiber-optic transmitting or receiving component by which a beam path between a transmitter or receiver and an optical fiber can be accurately adjusted during an assembly process. For this purpose, the transmitting or receiving component has a beam deflection device, which is also referred to as a deflection receptacle, in which two assemblies can be adjusted relative to one another and can be fixed in a desired position relative to one another during the assembly process.

In recent years, surface mounting technology (SMT) has increasingly replaced the process of fitting components with wires to conductor strip carriers. The overriding advantage of SMT is the capability to fit components on boards fully automatically, very quickly, and thus cost-effectively, and this cannot be achieved by conventional component placement methods.

Owing to the high packing density that is desirable in many optical applications, SMT is of particular importance in the field of optoelectronics. Numerous optoelectronic components are already known which are configured in accordance with the SMT concept such that they can be surface-mounted.

The fundamental difficulty with fiber-optic transmitting or receiving components is to achieve optical coupling that is as good as possible between the optical fiber and the optoelectronic transmitter or receiver, as a rule a semiconductor laser or a semiconductor photodiode.

The surface-mounted, fiber-optic transmitting or receiving components known from the prior art have an SMD mounting frame which contains external connecting pins which are connected via electrical bushings to a transmitter or receiver installed in the mounting frame, such as a semiconductor laser or a semiconductor photodiode. A beam deflection device is mounted on the mounting frame, having at least one lens, one deflection mirror and one guide tube (ferrule) which can be moved axially. Since the beam deflection device is prefabricated, its individual components are internally rigidly connected to one another at the time when it is mounted on the mounting frame. In consequence, it is no longer possible to retrospectively compensate for specific discrepancies, resulting from the manufacturing process, by adjustment. In particular, discrepancies in the position or orientation of the optical axis of the fiber at right angles to the mounting plane of the deflection receptacle are problematic in this context and can, for example, lead to poorer coupling of the radiation beam emitted from a transmitter into the optical fiber.

SUMMARY OF THE INVENTION

It is accordingly an object of the invention to provide a surface-mounted, fiber-optic transmitting or receiving component having a deflection receptacle which can be adjusted during assembly and a method for its assembly which overcome the above-mentioned disadvantages of the prior art devices and methods of this general type, in which an optical beam path between a transmitter or a receiver and the light inlet or outlet end, respectively, of an optical fiber, can be aligned precisely.

With the foregoing and other objects in view there is provided, in accordance with the invention, a surface-mounted, fiber-optic component formed of a mounting platform having a recess formed therein, a first side and a second side. A device having electrical connections and selected from the group consisting of transmitters and receivers is provided. The device is fixed on the first side of the mounting platform. A beam deflection device is mounted on the second side of the mounting platform. The beam deflection device has a first assembly with a deflection mirror and a second assembly with a fiber holding device. The first assembly and the second assembly can be adjusted relative to one another and fixed in a desired position during an assembly process. A mounting frame, is provided, for housing the mounting platform. The mounting frame has external connecting pins and electrical bushings through which the electrical connections of the device are connected to the external connecting pins of the mounting frame.

In the method according to the invention for assembling the surface-mounted, fiber-optic transmitting or receiving component, the first assembly is fixed on one side of the mounting platform. The transmitter or receiver is mounted on the other side of the mounting platform. The second assembly is placed on the first assembly and on the surface of the mounting platform. The second assembly is moved in such a way that an optical beam path is produced between a radiation beam emerging from the optical fiber and a receiver, or for a radiation beam, emerging from a transmitter and the optical fiber. The second assembly is fixed in a desired position on the mounting platform and on the first assembly, and the mounting platform is inserted into the mounting frame.

The optical beam path between the transmitter or receiver and the inlet or outlet end of the optical fiber can thus be aligned precisely during the assembly of the surface-mounted, fiber-optic transmitting or receiving component. The second assembly is not fixed on the mounting platform and on the first assembly until this precise alignment has been achieved. The assemblies and the mounting platform are preferably made of metal so that the fixing process can be carried out in a conventional manner by a welded joint.

In one preferred embodiment, the first assembly is in the form of a right-angled bracket which, and within the right angle, has a surface which runs obliquely between the limbs and on which the deflection mirror is disposed. Furthermore, the second assembly has two main surfaces which are opposite and parallel to one another, between which an optical fiber is routed in a bushing, which is parallel to the main surfaces, as far as one side surface of the first assembly. A first main surface of the second assembly is mounted on a planar surface of the mounting platform. A an inner surface of one of the limbs of the first assembly rests on the second main surface of the second assembly in such a way that the deflection mirror faces the side surface of the first assembly and hence one end of the optical fiber. Another limb of the second assembly rests at right angles on the planar surface of the mounting platform, so that the second assembly can be moved on the planar surface of the mounting platform during the assembly process, and is fixed in a desired position on the planar surface.

Furthermore, a lens, which is held on the second assembly, is preferably disposed between the bushing in the mounting platform and the deflection mirror. The lens and a section of the second assembly that holds it (i.e. a lens holding device) can in this case be disposed in a widened region of the recess. The lens may be a spherical lens, which is held by a tubular section on the second assembly.

The first assembly, the second assembly and the mounting platform are preferably made of metal and are welded to one another. More specifically, the second assembly is welded to the mounting platform and the first assembly.

Furthermore, a guide tube, in particular a ferrule, which can be moved axially is disposed in the bushing (which contains the optical fiber) of the second assembly, by which guide tube the optical fiber can be moved along its optical axis.

With regard to the fitting of the transmitter or receiver, a transparent heat sink or submount, which covers the recess, can be fitted on one side of the recess in the mounting platform. On which heat sink the transmitter or receiver is disposed by, if necessary, additional optical elements in such a way that an optical beam path can be produced between the transmitter or receiver and the optical fiber.

Other features which are considered as characteristic for the invention are set forth in the appended claims.

Although the invention is illustrated and described herein as embodied in a surface-mounted, fiber-optic transmitting or receiving component having a deflection receptacle which can be adjusted during assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
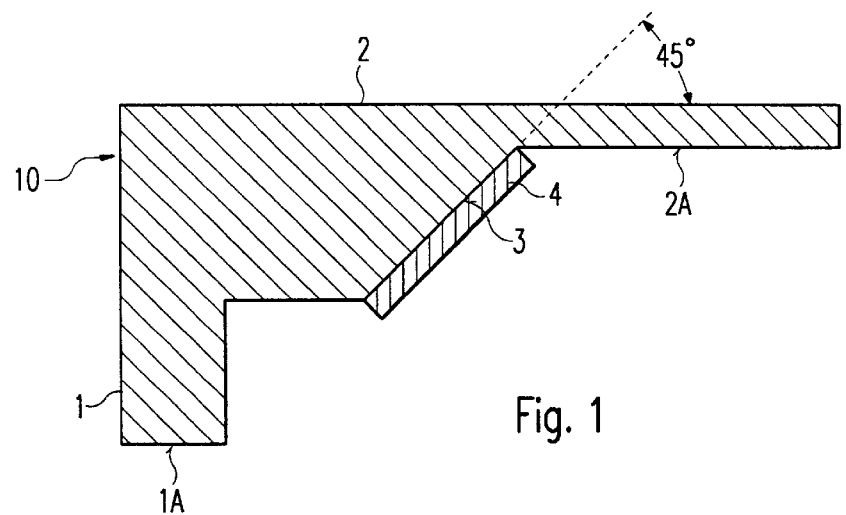
FIG. 1 is a diagrammatic, cross-sectional view of a first assembly of an exemplary embodiment of a fiber-optic transmitting or receiving component according to the invention.

In all the figures of the drawing, sub-features and integral parts that correspond to one another bear the same reference symbol in each case. Referring now to the figures of the drawing in detail and first, particularly, to FIGS. 1 and 2 thereof, there is shown an embodiment of two assemblies 10, 20 which can be adjusted with respect to one another during the assembly of a fiber-optic transmitting or receiving component. The assemblies 10, 20 are assembled to form a beam deflection device, which is also referred to as a deflection receptacle. A first assembly 10, shown in FIG. 1, is essentially in a form of a right-angle bracket, which is shown in cross section and has two limbs 1 and 2 at right angles to one another. While the limb 1 is relatively broad and thus has a relatively broad end edge 1A, the limb 2 is relatively long and, in consequence, has a relatively large-area inner limb surface 2A. This specific form of the first assembly 10 has been found to be advantageous for the subsequent adjustment of the first assembly 10 relative to a second assembly 20. An oblique surface 3 is formed between the limbs 1 and 2, and in each case forms an angle of 45° with the limbs 1 and 2. A deflection mirror 4 is placed on the oblique surface 3 and may, for example, be composed of a thin layer of a vapor-deposited metal coating or a dielectric coating. The mirror material is selected in order to achieve as high a reflectance as possible at the wavelength of optical light radiation to be used. The first assembly 10 is preferably made of metal, in order to allow it to be fixed to the second assembly 20 and to a mounting platform 30 (FIG. 3) by a conventional welding techniques.

Figure 2:
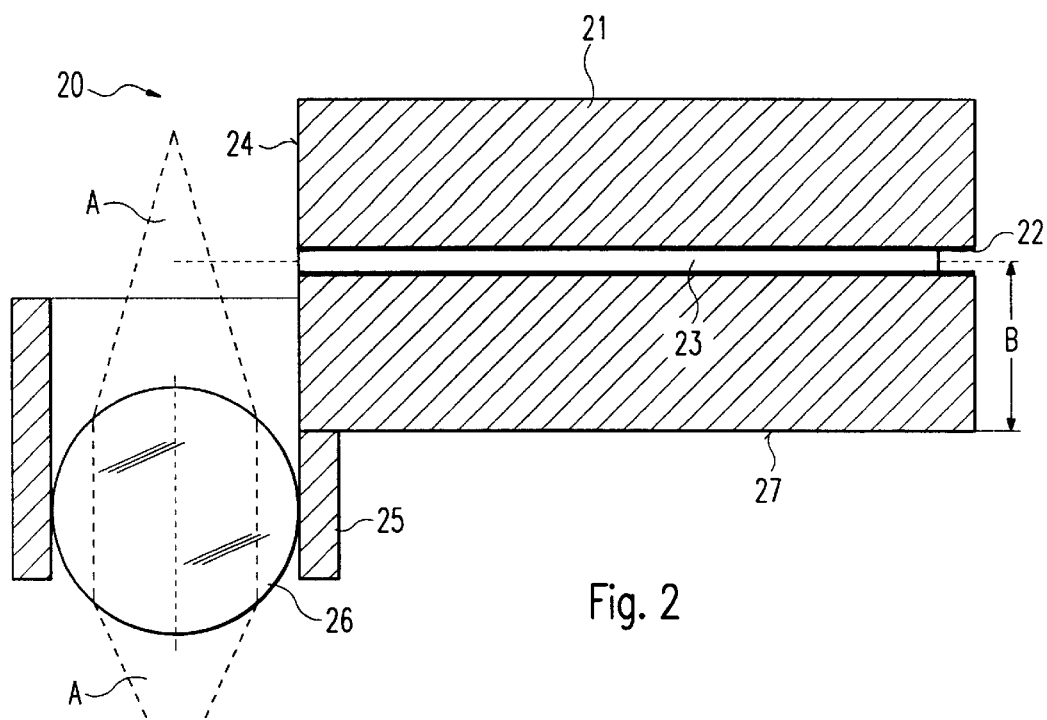
FIG. 2 is a cross-sectional view of a second assembly of the exemplary embodiment of the fiber-optic transmitting or receiving component according to the invention.

The second assembly 20, which interacts in a suitable way with the first assembly 10, is shown in cross section in FIG. 2. The second assembly 20 has an elongated fiber holding device 21, which has a central bushing 22 in which an optical fiber 23 is held and can be moved axially if required. The optical fiber 23 can be moved forward as far as a side surface 24 of the fiber holding device 21, so that a light inlet or outlet end of the optical fiber 23 is flush with the side surface 24. The second assembly 20 likewise has a lens holding device 25, which is used to hold a spherical lens 26. The lens holding device 25 is formed by a tubular section, which surrounds the spherical lens 26, is placed on the side surface 24 and on a main surface 27 of the fiber holding device 21, and runs at right angles to the fiber holding device 21 and to its main surfaces. The spherical lens 26 can be fixed by suitable fixing elements on inner walls of the tubular section. The lens 26 is used either to focus a radiation beam A emitted from a transmitter onto the light inlet end of the optical fiber 23, or to focus a radiation beam A emerging from the light outlet end of the optical fiber 23 onto a receiver. An optical axis of the spherical lens 26 is at right angles to the axis of the optical fiber 23.

The process of assembling the assemblies 10 and 20 with a mounting platform 30 will be explained in conjunction with FIG. 3, which shows a cross section of the assemblies 10 and 20 and the mounting platform 30 in the assembled state. Like the assemblies 10 and 20, the mounting platform 30 is preferably made of metal and has a circular aperture or recess 31, which has a widened region 32 on a side of the beam deflection device formed by the assemblies 10 and 20. On the other side of the mounting platform 30, an assembly 40 being either a transmitting assembly 40 (i.e. a semiconductor laser assembly) or a receiving assembly 40 (i.e. a semiconductor photodiode assembly), is mounted on the mounting platform 30 in a region of the aperture 31. The assembly 40, now described for the transmitting assembly 40, contains a transparent submount 42 on which an edge-emitting semiconductor laser 41 and suitable optical elements, such as deflection prisms, are bonded, by which the radiation beam emitted from the semiconductor laser 41 is deflected in the direction of the aperture 31 and the spherical lens 26. The widened region 32 of the aperture 31 in the mounting platform 30 is used to surround the lens holding device 25 and the spherical lens 26, held by it, in the second assembly 20 like a housing.

During the assembly process, the second assembly 20 is first of all placed on the mounting platform 30 so that the lens holding device 25 and the spherical lens 26 held by it come to rest in the widened region 32. The first assembly 10 is then placed on the second assembly 20 and on the mounting platform 30 in such a way that the deflection mirror 4 of the first assembly 10 is opposite the light inlet or light outlet end of the optical fiber 23. Due to manufacturing tolerances in the production of the second assembly 20 or irregularities on the mounting surface of the mounting platform 30, fluctuations B (see FIG. 2) can occur in the distance between the optical fiber 23 and the main surface 27. These fluctuations B normally lead to the deflection mirror 4 not being able to focus the radiation beam A exactly onto the light inlet end of the optical fiber 23 when the beam deflection device is assembled rigidly, according to the prior art. However, according to the present invention, the first assembly 10, which is still placed loosely on the second assembly 20 and on the mounting platform 30, can now be moved in the direction of the optical axis of the optical fiber 23, so that the radiation beam A strikes a different point on the deflection mirror 4 depending on the position of the first assembly 10, and can thus be focussed precisely onto the light inlet end of the optical fiber 23. The semiconductor laser 41 can be started up and the optical power injected into the optical fiber 23 can be measured as a function of the relative position of the first assembly 10. When this optical power is a maximum, then the beam path between the semiconductor laser 41 and the light inlet end of the optical fiber 23 is optimized. The first assembly 10 can be connected by a welded joint to the second assembly 20 and to the mounting platform 30, in a position in which the limb inner surface 2A and a limb outer edge 1A have now reached.

Figure 3:
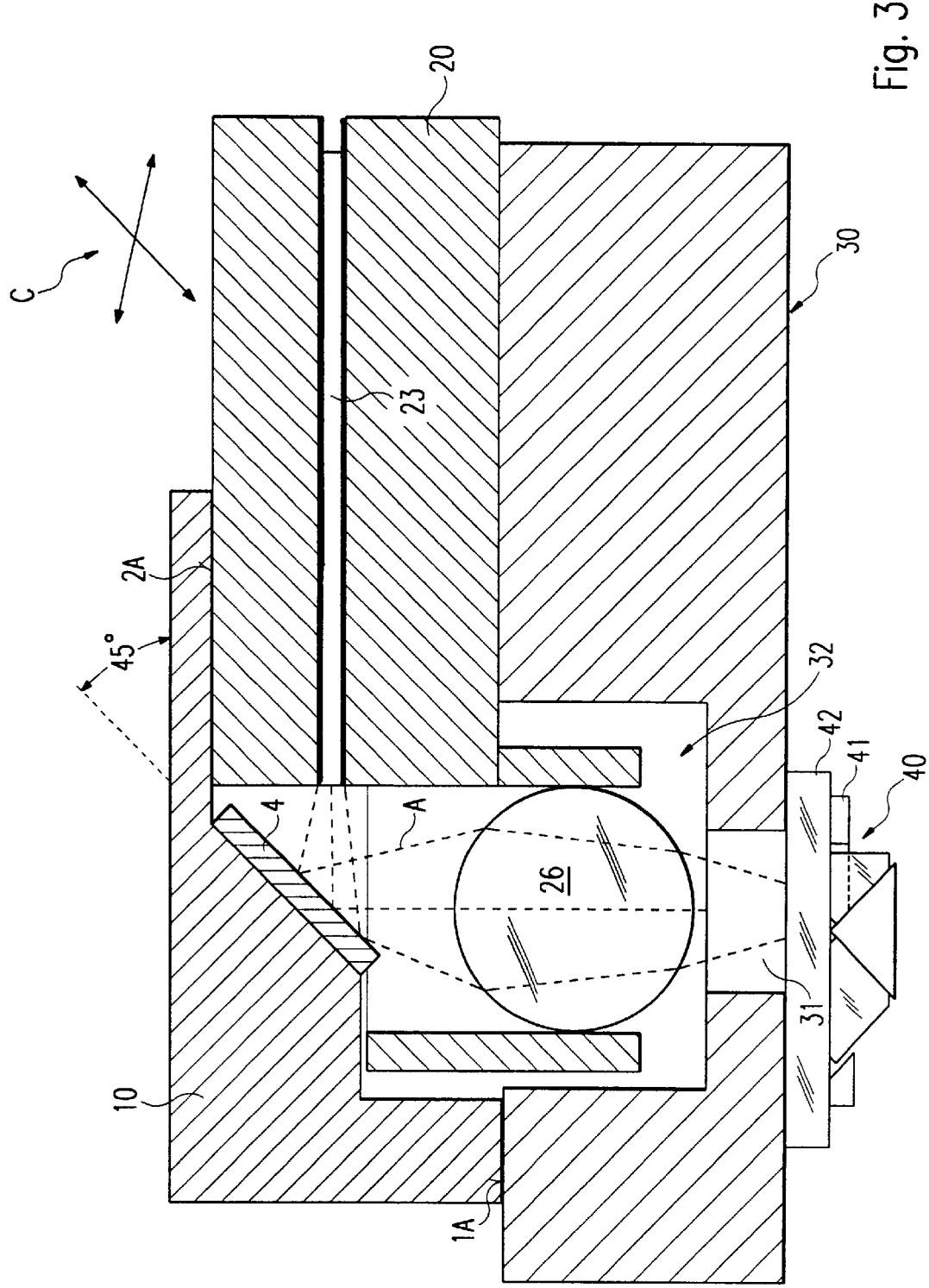
FIG. 3 is a cross-sectional view of the assemblies, which are fixed to one another and to a mounting platform, of the fiber-optic transmitting component according to the invention.

As is denoted by reference designator C in FIG. 3, the first assembly 10 may also be moved at right angles to the optical axis of the optical fiber 23 on the second assembly 20 and on the mounting platform 30, in order to optimize the lateral alignment of the optical beam path.

It is likewise feasible for the transmitting assembly 40 to be a receiving assembly 40 to be fitted to the mounting platform 30 instead of the transmitting assembly 40. In this case, a radiation beam emerges from the optical fiber 23 and is focussed by the deflection mirror 4 and the spherical lens 26, through the aperture 31 and the submount 42 and, if appropriate, further optical elements, onto the receiving component, such as a semiconductor photodiode or the like. In this case as well, the fluctuations B in the distance between the optical fiber 23 and the main surface 27 of the second assembly 20 may lead to the radiation beam A emerging from the optical fiber 23 initially striking an incorrect point on the deflection mirror 4 and, in consequence, not being focussed exactly onto the receiving component. The first assembly 10 is then moved, as already described above, until the photocurrent measured by the receiving component reaches a maximum. Once the maximum is reached, the optical beam path is optimized and the first assembly 10 can be fixed to the second assembly 20 and to the mounting platform 30 in the described manner.

Figure 4:
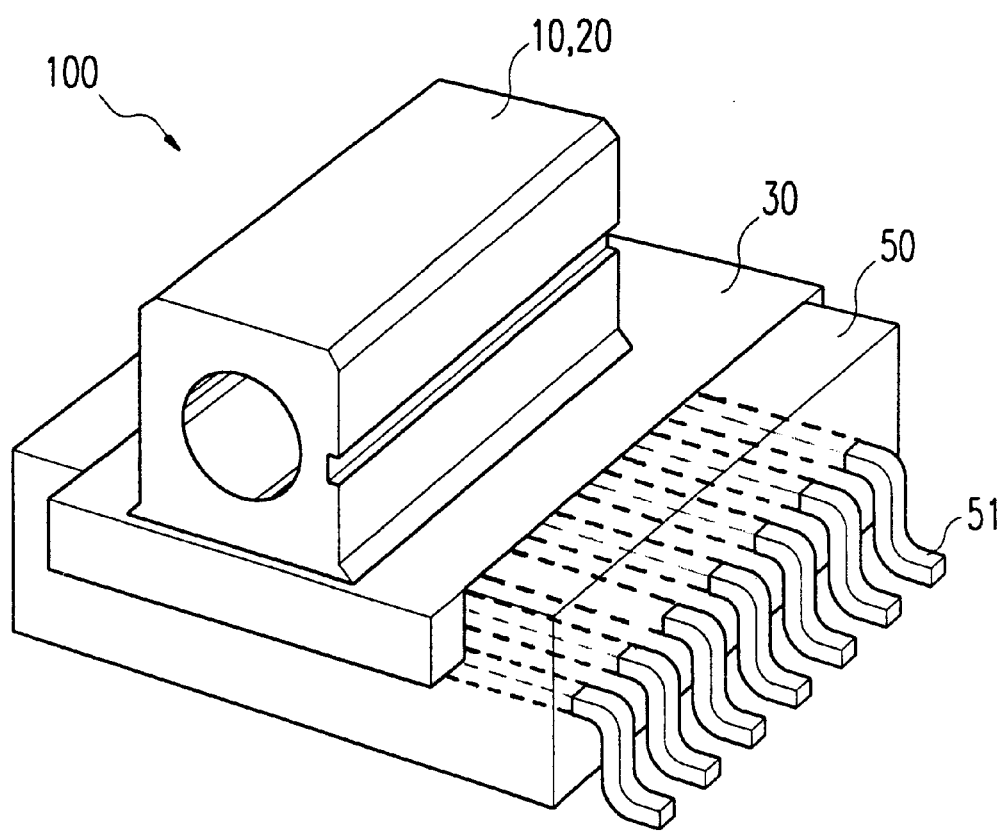
FIG. 4 is a perspective view of a finished embodiment of the fiber-optic transmitting or receiving component according to the invention.

FIG. 4 shows, by way of example, and schematically, a perspective view of a finished surface-mounted, fiber-optic transmitting or receiving component 100. The beam deflection device, which is composed of the two assemblies 10 and 20, is mounted on the mounting platform 30 therein, and the mounting platform 30 is in turn inserted in an SMD mounting frame 50. The latter has electrical bushings through which the electrical connections of the transmitter or receiver are connected to external connecting pins 51. Surface mounting can be carried out via the connecting pins 51.

The embodiment illustrated in the figures can be modified and varied in various ways. For example, it is possible for the optical fiber 23 to be routed inside a guide tube, in particular a so-called ferrule, disposed in the bushing 22 in the second assembly 20, and by which ferrule the optical fiber 23 can be moved along its optical axis.

Some other lens, such as a flat convergent lens, may also be used instead of the spherical lens 26. It is also feasible to dispense with any lens and, instead of this, to use a spherically, parabolically or hyperbolically curved deflection mirror 4.

I claim:

1. A surface-mounted, fiber-optic component, comprising:
    a mounting platform having a recess formed therein, a first side and a second side with a planar surface;
    a device having electrical connections and selected from the group consisting of transmitters and receivers, said device fixed on said first side of said mounting platform;
    a beam deflection device mounted on said second side of said mounting platform, said beam deflection device having:
        a first assembly being a right-angled bracket having limbs, a right angled region with a surface running obliquely between said limbs, and a deflection mirror being disposed on said surface; and
        a second assembly with a fiber holding device, said fiber holding device having a side surface, two main surfaces including a first main surface and a second main surface opposite and parallel to one another, a bushing and an optical fiber routed in said bushing parallel to said main surfaces as far as said side surface, said first main surface of said fiber holding device mounted on said planar surface of said mounting platform;
    one of said limbs of said first assembly having an inner surface resting on said second main surface of said fiber holding device such that said deflection mirror faces said side surface of said fiber holding device;
    another of said limbs of said first assembly having an inner surface resting at right angles on said planar surface of said mounting platform such that said first assembly can be moved on said planar surface of said mounting platform during an assembly process, and is fixed in a desired position on said planar surface;
    said first assembly and said second assembly can be adjusted relative to one another and fixed in a desired position during an assembly process; and
    a mounting frame for housing said mounting platform and having external connecting pins and electrical bushings through which said electrical connections of said device are connected to said external connecting pins of said mounting frame.

2. The component according to claim 1, including a lens held in said second assembly and disposed between said recess in said mounting platform and said deflection mirror.

3. The component according to claim 2, wherein:
    said second assembly has a lens holding device for holding said lens; and
    said recess has a widened region, and said lens holding device holding said lens is disposed in said widened region of said recess.

4. The component according to claim 3, wherein said lens is a spherical lens, and said lens holding device is a tubular section of said second assembly and holds said spherical lens.

5. The component according to claim 1, wherein said first assembly, said second assembly, and said mounting platform are made of metal and are fixed to one another by welded joints.

6. The component according to claim 2, including an axially movable guide tube disposed in said bushing of said second assembly, and said optical fiber has an optical axis and can move along said optical axis due to said guide tube.

7. The component according to claim 1, including:
   a transparent submount covering said recess of said mounting platform and mounted on one side of said recess; and
   additional optical elements for producing an optical beam path between said device and said optical fiber.

8. The component according to claim 6, wherein said guide tube is a ferrule.

9. A method for assembling a surface-mounted, fiber-optic component, which comprises the steps of:
   providing a mounting platform having a recess formed therein, a first side and a second side with a planar surface;
   mounting a device, selected from the group consisting of transmitters and receivers, on the first side of the mounting platform;
   providing a beam deflection device having:
      a first assembly being a right-angled bracket having limbs, a right angled region with a surface running obliquely between the limbs, and a deflection mirror being disposed on said surface; and
      a second assembly with a fiber holding device, the fiber holding device having a side surface, a first main surface and a second main surface opposite and parallel to one another, a bushing and an optical fiber routed in the bushing parallel to the main surfaces;
   mounting the beam deflection device on the second side of the mounting platform, which includes the steps of:
      mounting the first main surface of the fiber holding device on the planar surface of the mounting platform;
      resting one of the limbs of the first assembly on the second main surface of said fiber holding device;
      resting another of the limbs of the first assembly on the planar surface of the mounting platform;
      adjusting the first assembly by moving the limbs on the second main surface and the planar surface such that the deflection mirror aligns with the optical fiber of the fiber holding device;
      fixing the first assembly in a desired position on the mounting platform and on the second assembly;
   providing a mounting frame; and
   inserting the mounting platform into the mounting frame.

10. The method according to claim 9, which comprises welding the second assembly to the mounting platform and to the first assembly.

\* \* \* \* \*